United States Patent
Conyers et al.

(10) Patent No.: US 7,398,106 B2
(45) Date of Patent: Jul. 8, 2008

(54) DYNAMIC READJUSTMENT OF POWER

(75) Inventors: David J. Conyers, Minneapolis, MN (US); Jeffrey J. Cannon, St. Louis Park, MN (US); Douglas D. Weaver, Plymouth, MN (US); Santosh K. Sonbarse, Eden Prairie, MN (US); William J. Mitchell, Eden Prairie, MN (US); Michael J. Hermel, Waseca, MN (US); Donald R. Bauman, Waseca, MN (US); Jerry E. Toms, Shakopee, MN (US)

(73) Assignee: ADC Telecommunications, Inc., Eden Priarie, MN (US)

( * ) Notice: Subject to any disclaimer, the term of this patent is extended or adjusted under 35 U.S.C. 154(b) by 153 days.

(21) Appl. No.: 11/094,907

(22) Filed: Mar. 31, 2005

(65) Prior Publication Data

US 2006/0223578 A1    Oct. 5, 2006

(51) Int. Cl.
  *H04B 1/38* (2006.01)
  *H04M 1/00* (2006.01)
  *H04Q 7/20* (2006.01)
(52) U.S. Cl. ............... 455/557; 455/558; 455/561; 455/550.1; 455/556.2; 455/517; 455/522
(58) Field of Classification Search ......... 455/550.1, 455/556.2, 127.1–127.5, 161.2, 161.3, 186.1, 455/254, 256, 422.1, 418–421, 511–522, 455/123, 557–558, 560–561, 68–69, 70–71, 455/88–89, 13.4, 115.1, 226.2, 233.1, 423–425, 455/453, 125–126, 433–434; 370/328, 338, 370/332–333
See application file for complete search history.

(56) References Cited

U.S. PATENT DOCUMENTS 5,276,691 A    1/1994    Kivari (Continued)

FOREIGN PATENT DOCUMENTS

EP    1 211 817 A1 *  12/2000

(Continued)

OTHER PUBLICATIONS

U.S. Appl. No. 11/095,628, Toms et al.

(Continued)

*Primary Examiner*—Meless Zewdu
(74) *Attorney, Agent, or Firm*—Fogg & Powers LLC

(57) ABSTRACT

A dynamically reconfigurable communications system is presented. The communications system comprises a server, including one or more radio head interface modules, a call processing software module, and a radio head unit coupled to the radio head interface module over one or more transport mediums. The one or more radio head interface modules adapted to communicate with the call processing software module, wherein the call processing software performs modulation and demodulation of voice and data streams using one or more air interface protocols. The radio head unit communicates with one or more subscriber units using the one or more air interface protocols. The radio head interface module receives power level adjustment parameters from the call processing software module for one or more logical channels and reconfigures the signal gain of one or more communications channels based on the power level adjustment parameters.

19 Claims, 4 Drawing Sheets

U.S. PATENT DOCUMENTS

| | | | |
|---|---|---|---|
| 5,544,222 | A | 8/1996 | Robinson et al. |
| 5,649,000 | A | 7/1997 | Lee et al. |
| 5,701,294 | A | 12/1997 | Ward et al. |
| 5,854,978 | A | 12/1998 | Heidari |
| 6,047,002 | A | 4/2000 | Hartmann et al. |
| 6,091,765 | A | 7/2000 | Pietzold, III et al. |
| 6,097,733 | A | 8/2000 | Basu et al. |
| 6,188,898 | B1 | 2/2001 | Phillips |
| 6,363,421 | B2 | 3/2002 | Barker et al. |
| 6,381,289 | B1 | 4/2002 | Dutta |
| 6,496,546 | B1 | 12/2002 | Allpress et al. |
| 6,501,785 | B1 | 12/2002 | Chang et al. |
| 6,544,428 | B1 | 4/2003 | Higashi |
| 6,584,146 | B2 | 6/2003 | Bose et al. |
| 6,636,747 | B2 | 10/2003 | Harada et al. |
| 6,728,228 | B1 | 4/2004 | Ostman et al. |
| 6,775,303 | B1 | 8/2004 | Rustad et al. |
| 6,775,305 | B1 | 8/2004 | Delvaux |
| 6,788,961 | B2 | 9/2004 | Repice et al. |
| 6,810,270 | B1 | 10/2004 | Grohn et al. |
| 6,876,864 | B1 | 4/2005 | Chapin |
| 6,889,354 | B2 | 5/2005 | Feldman et al. |
| 6,912,228 | B1 * | 6/2005 | Dahlman et al. ............ 370/441 |
| 7,099,687 | B1 | 8/2006 | Makela et al. |
| 7,116,682 | B1 | 10/2006 | Waclawsky et al. |
| 7,151,925 | B2 | 12/2006 | Ting et al. |
| 7,190,682 | B2 * | 3/2007 | Shepherd et al. ............ 370/328 |
| 7,203,488 | B2 * | 4/2007 | Luneau ................... 455/422.1 |
| 2001/0024430 | A1 | 9/2001 | Sekine et al. |
| 2001/0031621 | A1 | 10/2001 | Schmutz |
| 2001/0037395 | A1 | 11/2001 | Sabat, Jr. et al. |
| 2002/0035633 | A1 | 3/2002 | Bose et al. |
| 2002/0093983 | A1 | 7/2002 | Newberg et al. |
| 2002/0169894 | A1 | 11/2002 | Takla |
| 2002/0186436 | A1 | 12/2002 | Mani et al. |
| 2002/0186674 | A1 | 12/2002 | Mani et al. |
| 2002/0187809 | A1 | 12/2002 | Mani et al. |
| 2002/0191565 | A1 | 12/2002 | Mani et al. |
| 2003/0036359 | A1 | 2/2003 | Dent et al. |
| 2003/0050098 | A1 | 3/2003 | D'Agati et al. |
| 2003/0142649 | A1 | 7/2003 | Taniguchi |
| 2004/0001429 | A1 | 1/2004 | Ma et al. |
| 2004/0005866 | A1 | 1/2004 | Igarashi |
| 2004/0033806 | A1 | 2/2004 | Daniel et al. |
| 2004/0042387 | A1 | 3/2004 | Geile |
| 2004/0132477 | A1 * | 7/2004 | Lundby et al. ............. 455/522 |
| 2004/0156328 | A1 | 8/2004 | Walton et al. |
| 2004/0156449 | A1 | 8/2004 | Bose et al. |
| 2004/0198410 | A1 | 10/2004 | Shepherd et al. |
| 2004/0198453 | A1 | 10/2004 | Cutrer et al. |
| 2004/0209580 | A1 | 10/2004 | Bose et al. |
| 2005/0190855 | A1 * | 9/2005 | Jin et al. .................... 375/296 |
| 2006/0034242 | A1 | 2/2006 | Proctor, Jr. |
| 2006/0141957 | A1 | 6/2006 | Fischer et al. |
| 2006/0222054 | A1 | 10/2006 | Conyers et al. |
| 2006/0227736 | A1 | 10/2006 | Conyers et al. |
| 2007/0032241 | A1 | 2/2007 | Busch et al. |

FOREIGN PATENT DOCUMENTS

| | | |
|---|---|---|
| WO | 0159993 | 8/2001 |
| WO | 2004047316 | 6/2004 |

OTHER PUBLICATIONS

U.S. Appl. No. 11/095,789, Hedin et al.
U.S. Appl. No. 11/094,848, Weaver et al.
U.S. Appl. No. 11/095,111, Hermel et al.
U.S. Appl. No. 11/095,112, Hedin et al.
U.S. Appl. No. 11/095,949, Hedin et al.
U.S. Appl. No. 11/095,113, Hedin et al.
U.S. Appl. No. 11/094,950, Hedin et al.
U.S. Appl. No. 11/094,947, Conyers et al.
U.S. Appl. No. 11/095,788, Conyers et al.
U.S. Appl. No. 11/095,150, Bauman et al.
U.S. Appl. No. 11/095,779, Hermel et al.

* cited by examiner

DYNAMIC READJUSTMENT OF POWER

CROSS REFERENCES TO RELATED APPLICATIONS

This application is related to the following co-pending U.S. patent applications filed on Mar. 31, 2005, all of which are hereby incorporated herein by reference:

U.S. patent application Ser. No. 11/095,788 entitled "DYNAMIC FREQUENCY HOPPING") and which is referred to here as the '672 Application;

U.S. patent application Ser. No. 11/095,628 entitled "DYNAMIC DIGITAL UP AND DOWN CONVERTERS") and which is referred to here as the '673 Application;

U.S. patent application Ser. No. 11/095,789 entitled "DYNAMIC RECONFIGURATION OF RESOURCES THROUGH PAGE HEADERS") and which is referred to here as the '675 Application;

U.S. patent application Ser. No. 11/094,848 entitled "SIGNAL ENHANCEMENT THROUGH DIVERSITY") and which i referred to here as the '676 Application;

U.S. patent application Ser. No. 11/095,111 entitled "SNMP MANAGEMENT IN A SOFTWARE DEFINED RADIO") and which is referred to here as the '677 Application;

U.S. patent application Ser. No. 11/095,112 entitled "TIME STAMP IN THE REVERSE PATH") and which is referred to here as the '678 Application;

U.S. patent application Ser. No. 11/094,949 entitled "BUFFERS HANDLING MULTIPLE PROTOCOLS") and which is referred to here as the '679 Application;

U.S. patent application Ser. No. 11/095,113 entitled "TIME START IN THE FORWARD PATH") and which is referred to here as the '680 Application;

U.S. patent application Ser. No. 11/094,950 entitled "LOSS OF PAGE SYNCHRONIZATION") and which is referred to here as the '681 Application;

U.S. patent application Ser. No. 11/094,947 entitled "DYNAMIC REALLOCATION OF BANDWIDTH AND MODULATION PROTOCOLS" and which is referred to here as the '684 Application;

U.S. patent application Ser. No. 11/095,150 entitled "METHODS AND SYSTEMS FOR HANDLING UNDERFLOW AND OVERFLOW IN A SOFTWARE DEFINED RADIO") and which is referred to here as the '686 Application; and U.S. patent application Ser. No. 11/095,779 entitled "INTEGRATED NETWORK MANAGEMENT OF A SOFTWARE DEFINED RADIO SYSTEM") and which is referred to here as the '700 Application.

TECHNICAL FIELD

The following description relates to communication systems and in particular to wireless communication systems.

BACKGROUND

Many changes are taking place in the way wireless communication networks are being deployed. Some of the changes are being driven by the adoption of new mobile communications standards. The introduction of software defined radios to wireless telecommunications has led to the generation of software and hardware solutions to meet the new standards.

A software defined radio (SDR) uses software for the modulation and demodulation of radio signals. The use of reprogrammable software allows key radio parameters, such as frequency and modulation protocols to be modified without the need to alter the underlying hardware of the system. Additionally, SDRs allow a single device to support multiple configurations which previously would have required multiple hardware devices. One example of a software defined radio is the Vanu Software Radio produced by Vanu, Inc. (See U.S. Pat. No. 6,654,428).

Current mobile communication standards introduce physical and logical channels and pose new issues in the transport of information within the communication networks. Some modulation protocols that wireless communication networks operate with includes, but is not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

Purchasing hardware designed to operate with only a single standard results in idle resources at times when network demand for that modulation standard is low. To avoid the expenses associated with operating and maintaining hardware dedicated to each standard, there is a need in the art today for communications network hardware that is modulation standard independent and can be dynamically reconfigured to support modulation standards based on the current demands on the network and operate with multiple standards simultaneously.

Another need generated by the adoption of new mobile communications standards is ability for communications network hardware to dynamically adjust the power levels of radio frequency transmissions in order to maintain acceptable signal quality as required by standards. Signal power level adjustments are required both in order to minimize co-channel interference and to conserve power.

For the reasons stated above, and for other reasons stated below that will become apparent to those skilled in the art upon reading and understanding the present specification, there is a need in the telecommunications industry for systems and methods for dynamically reconfigurable communication networks which can dynamically adjust communications signal gains.

SUMMARY

Embodiments of the present invention address the problem of adjusting the signal gains of communications signals transmitted through communications networks, as well as other problems and will be understood by reading and studying the following specification.

In one embodiment, a communications system is presented. The communications system comprises a server, including one or more radio head interface modules, a call processing software module, and a radio head unit coupled to the radio head interface module over one or more transport mediums. The one or more radio head interface modules adapted to communicate with the call processing software module, wherein the call processing software performs modulation and demodulation of voice and data streams using one or more air interface protocols. The radio head unit communicates with one or more subscriber units using the one or more air interface protocols. The radio head interface module receives power level adjustment parameters from the call processing software module for one or more logical channels and reconfigures the signal gain of one or more communications channels based on the power level adjustment parameters.

In yet another embodiment, a method for dynamic signal gain adjustment for a communications network logical channel is disclosed. The method comprises receiving signal gain adjustment parameters indicating a desired signal gain and a designated trigger event, determining digital frequency converter filter parameters for the desired signal gain, and reconfiguring a digital frequency converter with the filter parameters upon occurrence of the designated trigger event.

In yet another embodiment, a computer-readable medium having computer-executable instructions for a method for dynamic signal gain adjustment for a communications network logical channel is provided. The method comprises receiving signal gain adjustment parameters indicating a desired signal gain and a designated trigger event, determining digital frequency converter filter parameters for the desired signal gain, and reconfiguring a digital frequency converter with the filter parameters upon occurrence of the designated trigger event.

In still another embodiment, another communication system is provided. The communication system comprises a software module, a radio head interface module, a radio head unit, a means for embedding channel signal gain parameters into a page header of a page of a first set of complex RF data samples, a means for communicating the page of the first set of complex RF data samples and page header from the software module to the radio head interface module, a means for extracting the channel signal gain parameters from the page header, a means of communicating a second set of complex RF data samples from the radio head interface module to the radio head unit, and a means for adjusting the signal gain of the second set of complex RF data samples based on the channel signal gain parameters.

DRAWINGS

The present invention is more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention concern portions of a cellular telecommunications network that typically comprises one or more cellular antennas, a remote unit (also called a radio head) transmitting and receiving voice and/or data communications, and a base station (also commonly called a base transceiver station (BTS), or a server) that communicates data between the remote unit and a larger communication network (e.g. the public switched telephone network, or the Internet). One or more base stations are connected to a base station controller (BSC) which controls data communication flows in one or more connected base stations.

In some embodiments, communications between a BTS and a remote unit take place through two sets of data streams. Typically, forward logical channels carry data streams from the BTS through the remote unit to the end user device. Reverse logical channels carry data streams from the end user devices through the remote unit to the BTS. Each of the logical channels is assigned a radio frequency (RF) channel and a modulation protocol, which the remote unit uses to wirelessly communicate data with individual cellular devices.

Figure 1A:
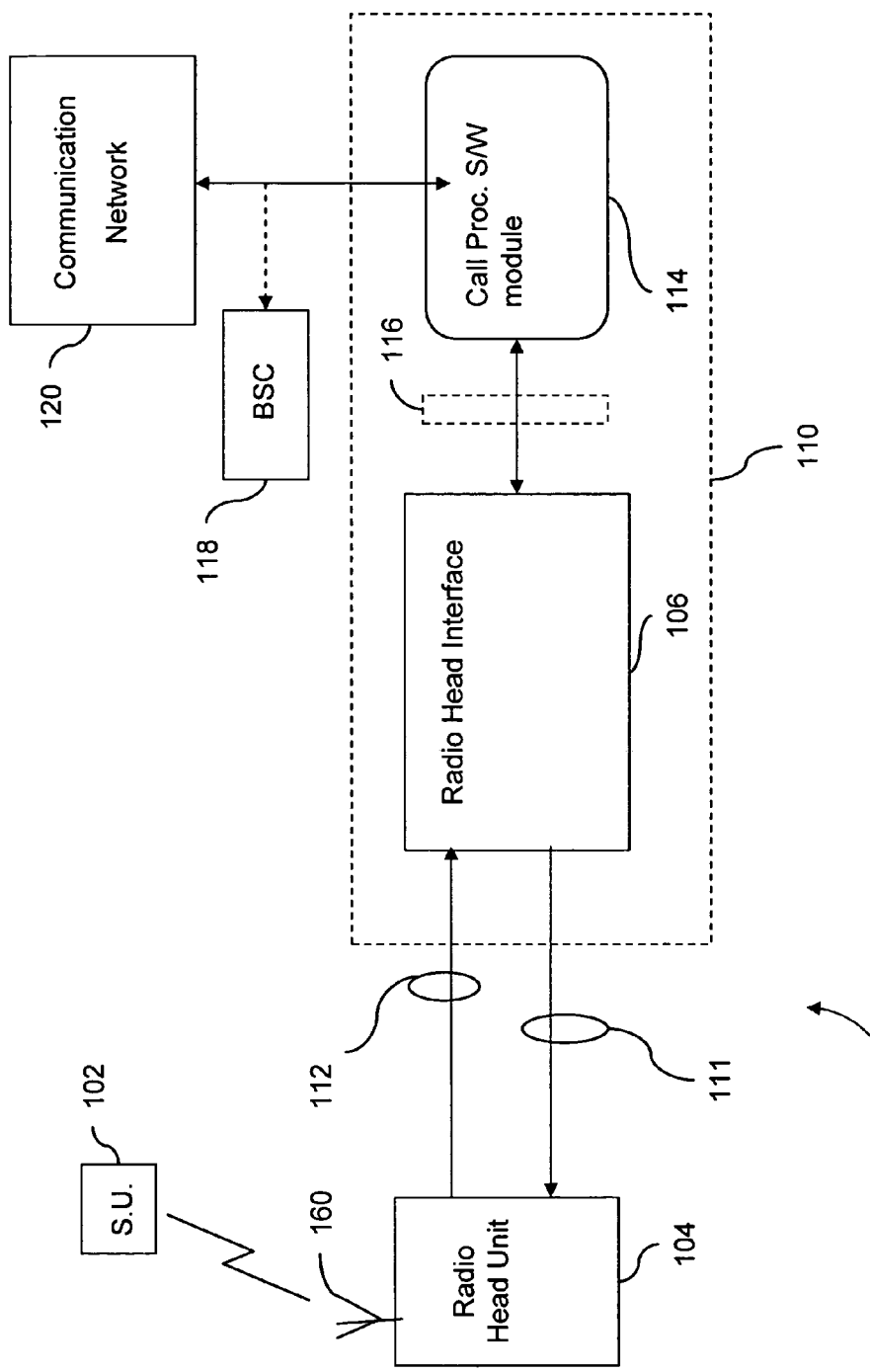
FIGS. 1A, 1B and 1C are block diagrams of one embodiment of a communications system of the present invention.

FIG. 1A is a block diagram of one embodiment of a communication system shown generally at 100. Communication system 100 includes one or more subscriber units 102 (or mobile devices 102) within a service area of a radio head unit 104. Radio head unit 104 is coupled to one or more servers 110 (or BTS 110) over one or more transport mediums 111, and 112. In one embodiment, transport mediums 111 and 112 comprise one or more high speed transport mediums.

In one embodiment, transport mediums 111 and 112 comprise one or more high speed digital data transport mediums. In one embodiment, transport mediums 111 and 112 comprises one or more optical fiber data paths. It would be well understood by one in the art upon reading this specification that transmit mediums 111 and 112 are not limited to optical fiber media but that embodiments include any optical or electrical transport media.

BTS 110 is connected to one or more communication networks 120 (e.g. public switched telephone network (PSTN), Internet, a cable network, or the like). In one embodiment, BTS 110 is connected to one or more communications networks through a base station controller (BSC) 118. In one embodiment, BTS 110 includes a call processing software module 114 (or call processing software 114) that interfaces between a radio head interface module 106 and one or more communication networks 120. In one embodiment, call processing software module 114 is comprised of one or more software applications. In one embodiment, call processing software module 114 also includes programming which implements an SDR with the BTS 110 and radio head unit 104 hardware, digitally performing waveform processing to modulate and demodulate radio signals transmitted and received, respectively, from cellular antennas 160. In one embodiment, call processing software module 114 is a Vanu, Inc., Vanu Software Radio.

In one embodiment, network 100 is a bidirectional network and as shown includes equipment for forward links (i.e. transmissions on forward logical channels from communications network 120 to mobile device 102) and reverse links (i.e. transmissions on reverse logical channels from mobile device 102 to communications network 120).

In some embodiments, additional reverse links are also provided that duplicate the reverse logical channels. In some embodiments, this set of duplicate reverse logical channels are called diversity channels. It should be understood that descriptions in this specification relating to embodiments of reverse logical channels also apply to such diversity channels.

Further details pertaining to the advantages and operation of diversity channels are provided in the '676 Application incorporated herein by reference.

Radio head unit 104 consists fundamentally of an antenna, a duplexer, a multicarrier power amplifier and low-noise amplifier. Radio head unit 104 communicates with one or more subscriber units 102 in a particular coverage area over forward and reverse links provided through radio head unit 104's associated antenna 160. In the forward link, call processing software module 114 generates representations of voice/data signals into data streams that are transported to radio head unit 104 via transport mediums 111. The forward link includes a forward radio frequency (RF) channel over which radio head unit 104 transmits the representations of voice/data signals to subscriber unit 102. Subscriber unit 102 transmits back to remote unit 104 over a reverse RF channel. Radio head unit 104 is responsible for receiving the RF signal from subscriber units 102, digitizing the RF signal and converting the digitized RF signal to a digital representation signal for transmission as a reverse link data stream over one or more transport mediums 112 to BTS 110. Subscriber unit 102 as used in this application includes, but is not limited to, cellular telephones, pagers, personal digital assistants, wireless modems, and other wireless terminals. Subscriber unit 102 may be a hand held device, a mobile station or a fixed station such as in a wireless local loop system. The radio head unit 104 communicates received signals to server 110 for routing to one or more communication networks 120.

In one embodiment, BTS 110 communicates with radio head unit 104 through radio head interface module 106 (or radio head interface 106). Radio head interface 106 establishes high speed digital communication paths for two or more sets of base band data stream logical channels and all communication between BTS 110 and radio head unit 104 goes through radio head interface 106. Radio head interface 106 and radio head unit 104 both handle multiple types of modulation protocols, and in different embodiments, one or more of the logical channels transmit data using a different modulation protocol than another logical channel. In one embodiment, radio head unit 104, radio head interface module 106, and call processing software module 114 handle modulation protocols for one or more of, but not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), Orthogonal Frequency Division Multiplexing (OFDM), or any other appropriate modulation protocol. A modulation protocol is commonly also referred to as an air interface standard, a modulation standard, an air interface protocol, or an air interface modulation protocol. For each logical channel, call processing software module 114 performs modulation and demodulation of forward and reverse logical channel voice and data streams using one or more of the air interface standard protocols.

In one embodiment, radio head interface module 106 is coupled to BTS 110 through an interface device 116. In one embodiment, interface device 116 is one of, but not limited to a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface or a high speed parallel interface.

During initial configuration of communication system 100, digital up-converter (DUC) and digital down-converter (DDC) filter parameters and sampling rates are loaded into radio head interface 106 for one or more of the protocols supported by radio head unit 104. Such parameters include, but are not limited to, filter parameters and sampling rates necessary to support valid RF channel, signal bandwidth, signal gain, and protocol configurations. Additional details regarding the configuration and operation of DUCs and DDCs are discussed in the '673 Application, incorporated herein by reference. In one embodiment, the parameters are stored in a table in memory in radio head interface 106.

Embodiments of the present invention enable radio head interface 106 to adjust the signal gain (i.e. the signal power level) of RF signals transmitted by radio head unit 104 and the signal gain of digitized RF signals received from radio head unit 104 by radio head interface 106.

Figure 1B:
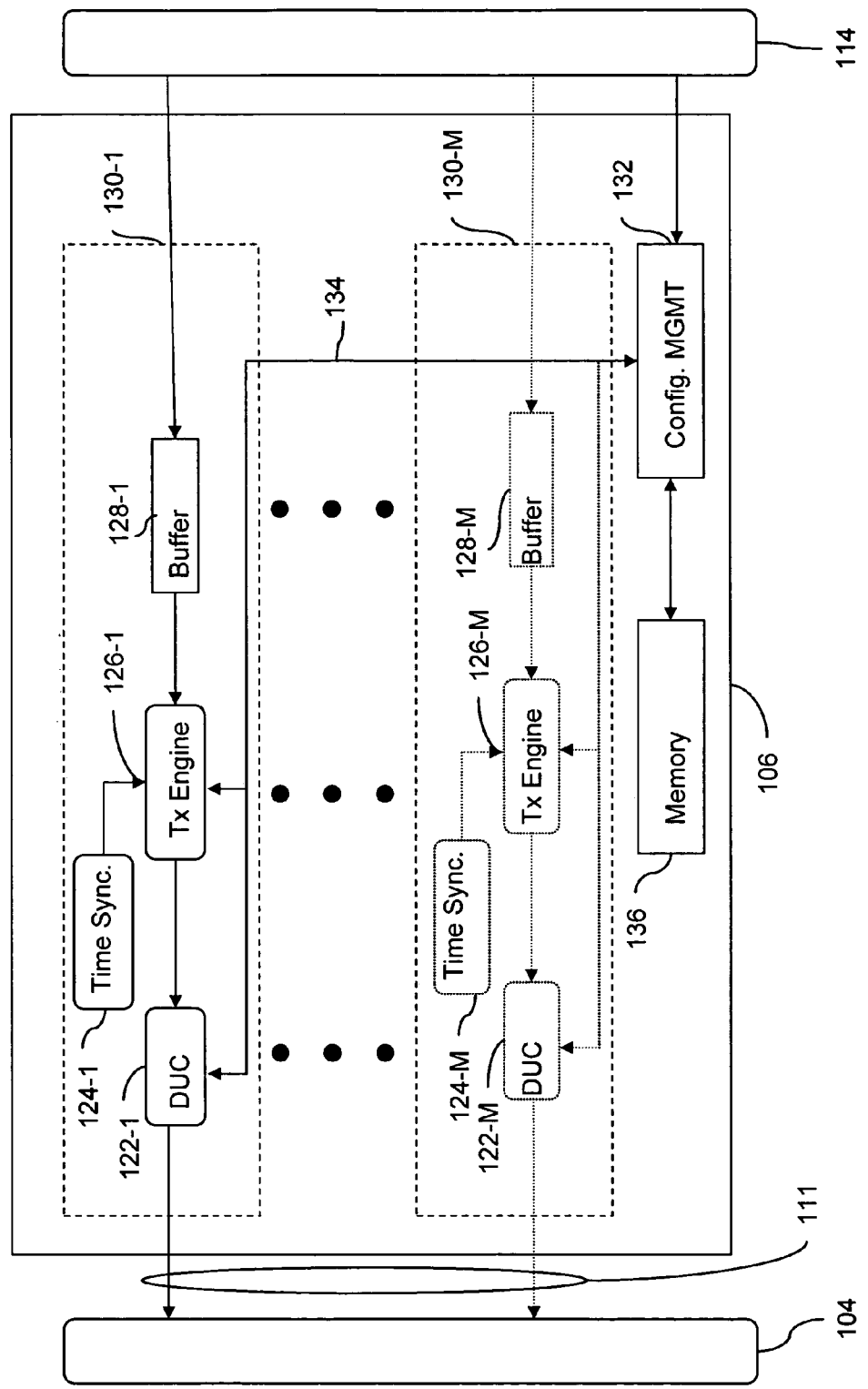

FIG. 1B illustrates one embodiment of a forward logical channel 130-1 data path. A radio head interface forward logical channel comprises a transmit buffer 128-1, a transmit engine 126-1, a DUC 122-1 and a time synchronizer 124-1. In operation, in one embodiment, transmit buffer 128-1 receives a page of complex data samples from call processing software 114. Transmit engine 126-1 removes the page of complex data samples from the transmit buffer 128-1 and sends the data samples to DUC 122-1. In one embodiment, transmit engine 126-1 holds the page of complex data samples until time synchronizer 124-1 determines that the current time matches a start time code embedded within the page. When the two times match, transmit engine 126-1 starts transmitting the page of complex data samples to DUC 122-1.

In one embodiment, call processing software 114 modulates representations of voice/data signals for forward logical channel 130-1 to an intermediate (or baseband) frequency to produce a page of a first set of complex RF data samples. DUC 122-1 converts the page of the first set of complex RF data samples from the baseband frequency used by call processing software 114 into a digital stream of representations of voice/data signals modulated at a center frequency designated for the RF channel assigned to logical channel 130-1, and outputs the digital stream as a second set of complex RF data samples. In one embodiment, the first set of complex RF data samples are 16 bit data samples. In one embodiment, the second set of complex RF data samples are 14 bit data samples. Embodiments of the present invention provide for dynamic readjustment of the signal power level (i.e. the signal gain) of the signal broadcasted by radio head unit 104 by reconfiguring DUC 122-1 with filter parameters that either increase of decrease the signal amplitudes of the complex RF data samples processed by DUC 122-1. Increased signal amplitude results in higher power output from 104's RF transmitter while decreased signal amplitudes result in lower power output.

In one embodiment, radio head interface card 106 comprises a plurality of M forward logical channels 130-1 through 130-M each having transmit buffers 128-1 through 126-M, transmit engines 126-1 through 126-M, DUCs 122-1 through 122-M and time synchronizers 124-1 through 124-M, each operating as described herein.

In one embodiment, radio head interface 106 is dynamically reconfigured to adjust the signal power level of data signals transmitted through forward logical channel 130-1. In operation, in one embodiment, configuration management unit 132 receives information from call processing software module 114 to adjust the signal power level of logical channel 130-1. Configuration management unit 132 looks up the associated parameters for the desired signal gain from the table located in memory 136. Through control channel 134, configuration management unit 132 loads appropriate filter coefficients to DUC 122-1. In one embodiment, DUC 122-1 is adapted with a buffer memory which holds the parameters received from configuration management unit 132. In one embodiment, transmit engine 126-1 sends a synchronization signal to DUC 122-1 to load the parameters from buffer memory into DUC 122-1's active registers. Once the parameters are loaded into the active registers, logical channel 130-1 amplifies forward link data samples based on the signal power level specified by call processing software module 114.

In one embodiment, radio head interface 106 is dynamically reconfigured to adjust reverse logical channel 140-1 signal gain for reverse link data samples. Increasing or decreasing the signal gain of a reverse logical channel may be desired in situations where changes in network hardware (e.g. replacement of a cellular antenna on radio head 104) alter the overall signal gain of a logical channel. In other embodiments utilizing diversity logical channels, dynamic adjustment of signal gains for associated reverse and diversity logical channels allows the two reverse link data stream signal power levels to be equalized independent of diverse network hardware such as, but not limited to, antennas with different gains.

Figure 1C:
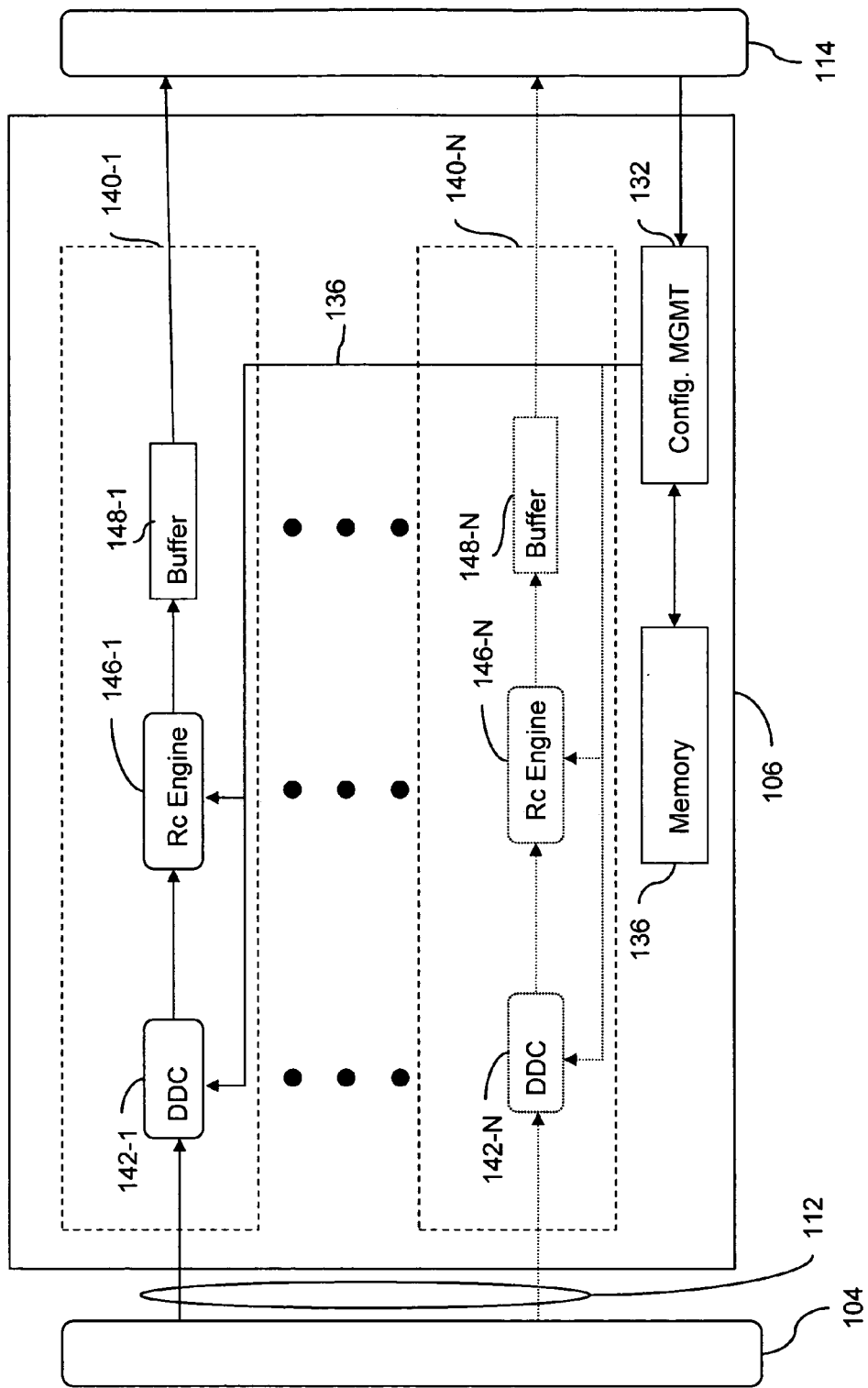

In FIG. 1C, one embodiment of the present invention for a reverse logical channel 140-1 data path is illustrated. A radio head interface 106 reverse logical channel 140-1 comprises a receiver buffer 148-1, a receive engine 146-1, and a DDC 142-1. In one embodiment, radio head interface card 106 comprises a plurality of N reverse logical channels 140-1 through 140-N each having receiver buffers 148-1 through 148-N, receive engines 146-1 through 146-N and DDCs 142-1 through 142-N. In operation, in one embodiment, subscriber unit 102 modulates representations of voice/data signals into a digital stream of representations of voice/data signals (a third set of complex RF data samples) modulated at a center frequency designated for the RF channel assigned to reverse logical channel 140-1. DDC 142-1 converts the digital stream into complex RF data samples modulated at an intermediate (or baseband) frequency used by call processing software 114. Receive engine 146-1 receives the complex RF data samples from DDC 142-1 and places them into a receiver buffer 148-1. As receiver buffer 148-1 fills, it creates a page of a fourth set of complex RF data samples. In one embodiment, the thirds set of complex RF data samples are 14 bit samples. In one embodiment, the fourth set of complex RF data samples are 16 bit samples. The completed page is subsequently received and processed by call processing software module 114. Embodiments of the present invention provide for dynamic readjustment of the signal power level (i.e. the signal gain) of the complex RF data signals received by call processing software 114 by reconfiguring DDC 142-1 with filter parameters that either increase of decrease the signal amplitudes of the complex RF data samples processed by DDC 142-1. In one embodiment, reverse logical channel 140-1 is a diversity logical channel.

In operation, in one embodiment, configuration management unit 132 receives information from call processing software module 114 to adjust the reverse link signal gain for logical channel 140-1. Configuration management unit 132 looks up the associated parameters for the desired signal gain from the table located in memory unit 136. Through control channel 134 configuration management unit 132 loads the appropriate filter coefficients to DDC 142-1. In one embodiment, DDC 142-1 is adapted with a buffer memory that holds the parameters received from configuration management unit 132. In one embodiment, an associate forward logical channel 130-1's transmit engine 126-1 sends a synchronization signal to DDC 142-1 to load the parameters from the buffer memory into DDC 142-1's active registers. Once the parameters are loaded into the active registers, logical channel 140-1 amplifies reverse link data samples based on the signal gain specified by call processing software module 114.

In one embodiment, configuration management unit 132 is adapted to know the transmitter power ratings for each modulation protocol supported by the radio head unit 104 hardware based on the parameter table stored in memory unit 136. In one embodiment, the transmitter power ratings are loaded into memory unit 136 during the initial configuration of communications system 100. In some embodiments, when call processing software module 114 instructs radio head interface 106 to adjust the signal power level beyond the range of radio head unit 104's transmitter power ratings, radio head interface 106 generates an error condition flag to call processing software module 114. In one embodiment, when call processing software module 114 instructs radio head interface 106 to adjust the signal power level at an invalid designated time, radio head interface 106 generates an error condition flag to call processing software module 114. In one embodiment, radio head interface 106 is adapted to disregard signal power level adjustment instructions from call processing software module 114 that result in the generation of an error condition flag.

Figure 2:
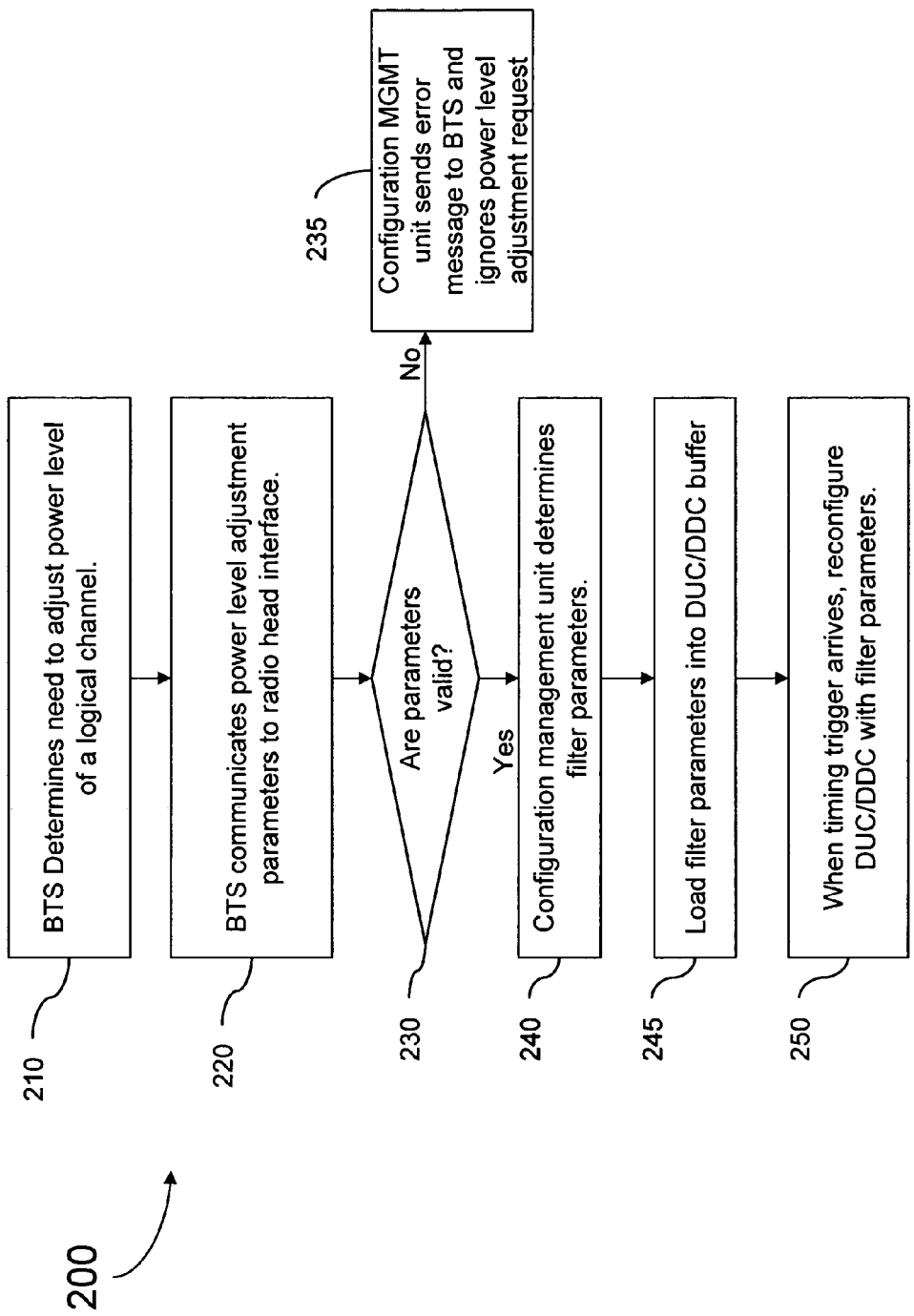
FIG. 2 is a flow chart of a method for practicing one embodiment of the present invention.

FIG. 2 is a flow chart of one embodiment of dynamic signal power level adjustments, based on the apparatus of FIGS. 1A, 1B and 1C of the present invention, shown generally at 200. A BTS determines the need to adjust the signal power level of a logical channel (210). The BTS communicates signal power adjustment parameters to a radio head interface (220). In one embodiment, signal power adjustment parameters include signal gain parameters and a timing trigger indicating when to perform the power level adjustment. In one embodiment, the timing trigger indicates a designated time based on a radio head interface internal clock. In one embodiment, the timing trigger is a specific data sample within a page of complex data samples. Next, the radio head interface determines whether the signal gain parameters are valid (230). In one embodiment, the radio head interface determines whether the signal gain parameters are valid for the radio head hardware coupled to the radio head interface. In one embodiment, the radio head interface further verifies that the timing trigger is valid, when the trigger is in the form of a designated time. When the signal gain parameters are valid, a configuration management unit determines the required DUC/DDC filter parameters (240) (DUC filter parameters for forward direction logical channels and DDC filter parameters for reverse direction logical channels). In one embodiment, the configuration management unit loads the filter parameters into DUC/DDC buffers (245). When the timing trigger arrives, the DUC/DDC is reconfigured to output digital signals with the new signal gain (250). In one embodiment, the radio head then begins transmitting RF signals at the new signal power level. In one embodiment, when the signal gain parameters are not valid, the radio head interface ignores the signal power level adjustment parameters sent by the BTS and in one embodiment, radio head interface then sends an error message to the BTS (235).

In one embodiment, signal power level adjustment parameters are communicated from call processing software module 114 to configuration management unit 132 through a page header. In one embodiment, call processing software module 114 outputs to logical channel 130-1's transmit buffer 128-1 a page of complex data samples representing voice and data communications. Prefixed to the data samples, is a page header that in one embodiment includes one or more of, but not limited to, a signal gain indicator (SGI), signal gain parameters, and a timing trigger. Further details concerning the communication of radio head interface module signal power adjustment parameters through page headers is described in the '675 Application herein incorporated by reference.

In one embodiment, transmit engine 126-1 removes the page header from the page of complex RF data samples, sending only the complex RF data samples representing voice and data communications to DUC 122-1. Transmit engine 126-1 further evaluates the header for indicator flags. In one embodiment, when transmit engine 126-1 identifies an SGI flag, then one or more of, signal gain parameters and a timing trigger are further read from the page header and communicated to configuration management unit 132. As described previously, configuration management unit 132 then looks up associated filter parameters to reconfigure DUC 122-1. In one embodiment, the page header includes signal gain adjustment parameters for an associated reverse logical channel 140-1. In that case, transmit engine 126-1 communicates the signal gain parameters to configuration management unit 132 that then looks up associated filter parameters to reconfigure DDC 142-1.

Several ways are available to implement the radio head interface modules, software modules (e.g. call processing software modules), and BTS elements of the current invention. These include, but are not limited to systems such as, digital computer systems, programmable controllers, or field programmable gate arrays. Therefore other embodiments of the present invention are the program instructions resident on computer readable media which when implemented by such systems, enable the systems to implement embodiments of the present invention. Computer readable media include any form of computer memory, including but not limited to punch cards, magnetic disk or tape or any other magnetic storage system, any optical data storage system, flash ROM, non-volatile ROM, PROM, E-PROM or RAM, or any other form of permanent, semi-permanent, or temporary memory storage system or device.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communications system, comprising:
    a server, including:
        one or more radio head interface modules; and
        a call processing software module, the one or more radio head interface modules adapted to communicate with the call processing software module;
        wherein the call processing software performs modulation and demodulation of voice and data streams using one or more air interface protocols; and
    a radio head unit coupled to the radio head interface module over one or more transport mediums;
        wherein the radio head unit communicates with one or more subscriber units using the one or more air interface protocols;
        wherein the radio head interface module receives power level adjustment parameters from the call processing software module for one or more logical channels;
        wherein the radio head interface module reconfigures the signal gain of one or more communications channels based on the power level adjustment parameters.

2. The system of claim 1, wherein the server further comprises:
    one or more interface devices, wherein the one or more radio head interface modules communicate with the call processing software module over the one or more interface devices.

3. The system of claim 2, wherein one or more interface devices includes at least one of a PCI-X interface, a ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA cards interface, a high speed serial interface and a high speed parallel interface.

4. The system of claim 1, wherein one or more air interface protocols include at least one of Global System for Mobile communications (GSM), Advanced Mobile Phone System (AMPS), code division multiple access (CDMA), Wide-band CDMA, time division multiple access (TDMA), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

5. The system of claim 1, wherein power level adjustment parameters include at least one of a signal gain indicator, signal gain parameters, and a timing trigger.

6. The system of claim 5, wherein the timing trigger is a designated time.

7. The system of claim 6, wherein the designated time correlates to a time count internal to the radio head interface module.

8. The system of claim 7, wherein radio head interface module further comprises a global positioning system receiver, wherein the time count internal to the radio head interface module is synchronized with an output signal from the global positioning system receiver.

9. The system of claim 8, wherein the call processing software module is synchronized with an output signal from the global positioning system receiver.

10. The system of claim 5, wherein the timing trigger is a designated data sample.

11. The system of claim 1, wherein the call processing software communicates one or more pages of data samples with the one or more radio head interface modules, each of the one or more pages of data samples having a page header; wherein signal gain adjustment parameters are contained in the page header.

12. The system of claim 1, wherein the transport mediums are one or more of twisted pair cable, optical fiber, millimeter wave, coaxial cable, and Free Space Optics (FSO).

13. The system of claim 1, wherein the radio head interface module further comprises:
    a transmit buffer, the transmit buffer adapted to receive a data stream from the call processing software module and store the data stream as a page of data samples;
    a transmit engine;
    a digital upconverter, wherein the transmit engine is adapted to transfer the page of data samples from the transmit buffer to the digital upconverter;
    a configuration management unit adapted to receive power level adjustment parameters from the call processing software module; and
    a memory adapted with digital upconverter filter parameters;

wherein the configuration management unit is further adapted to access the memory to lookup digital upconverter filter parameters based on the power level adjustment parameters;

wherein the configuration management unit is further adapted to output the digital upconverter filter parameters to the digital upconverter.

14. The system of claim 13, wherein the radio head interface module further comprises:
a receive buffer;
a receive engine; and
a digital downconverter;
the receive engine adapted to transfer a data stream from the digital downconverter to the receive buffer, the receive buffer adapted to store the data stream as a page of data samples, the receive buffer further adapted to output the page of data samples to the call processing software module;
the memory further adapted with digital downconverter filter parameters;
wherein the configuration management unit is further adapted to access the memory to lookup digital downconverter filter parameters based on the power level adjustment parameters;
wherein the configuration management unit is further adapted to output the digital downconverter filter parameters to the digital downconverter.

15. A radio head interface module, the module comprising:
a transmit buffer, the transmit buffer adapted to receive a data stream from a call processing software module and store the data stream as a page of data samples having a page header;
a transmit engine;
a digital upconverter, the transmit engine adapted to transfer the page of data samples from the transmit buffer to the digital upconverter;
a configuration management unit adapted to receive power level adjustment parameters from the call processing software module; and
a memory adapted with digital upconverter filter parameters;
wherein the configuration management unit is further adapted to access the memory to lookup associated digital upconverter filter parameters based on the power level adjustment parameters;
wherein the configuration management unit is further adapted to output the associated digital upconverter filter parameters to the digital up converter.

16. The radio head interface module of claim 15, the module further comprising:
a receive buffer;
a receive engine; and
a digital downconverter;
the receive engine adapted to transfer a data stream from the digital downconverter to the receive buffer, the receive buffer adapted to store the data stream as a page of data samples, the receive buffer further adapted to output the page of data samples to the call processing software;
the memory further adapted with digital downconverter filter parameters;
wherein the configuration management unit is further adapted to access the memory to lookup the associated digital downconverter filter parameters based on the power level adjustment parameters; and
wherein the configuration management unit is further adapted to output the associated digital downconverter filter parameters to the digital downconverter.

17. A communication system comprising:
a software module;
a radio head interface module;
a radio head unit;
means for embedding channel signal gain parameters into a page header of a page of a first set of complex RF data samples;
means for communicating the page of the first set of complex RF data samples and page header from the software module to the radio head interface module;
means for extracting the channel signal gain parameters from the page header;
means of communicating a second set of complex RF data samples from the radio head interface module to the radio head unit; and
means for adjusting the signal gain of the second set of complex RF data samples based on the channel signal gain parameters.

18. The communication system of claim 17 further comprising:
means of communicating a third set of complex RF data samples from the radio head unit to the radio head interface module;
means of communicating a page of a forth set of complex RF data samples from the radio head interface to the software module; and
means for adjusting the signal gain of the forth set of complex RF data samples based on the channel signal gain parameters.

19. A communication system comprising:
a software module;
a radio head interface module;
a radio head unit;
means for embedding channel signal gain parameters into a page header of a page of a first set of complex RF data samples;
means for communicating the page of the first set of complex RF data samples and page header from the software module to the radio head interface module;
means for extracting the channel signal gain parameters from the page header;
means of communicating a second page of complex RF data samples from the radio head unit to the radio head interface module;
means of communicating a page of a third set of complex RF data samples from the radio head interface to the software module; and
means for adjusting the signal gain of the third set of complex RF data samples based on the channel signal gain parameters.

* * * * *

UNITED STATES PATENT AND TRADEMARK OFFICE
CERTIFICATE OF CORRECTION

PATENT NO. : 7,398,106 B2 Page 1 of 1
APPLICATION NO. : 11/094907
DATED : July 8, 2008
INVENTOR(S) : Conyers et al.

It is certified that error appears in the above-identified patent and that said Letters Patent is hereby corrected as shown below:

Title Page; item (73);
On page 1 of the issued patent, for the listed Assignee, replace the address of "Eden Priarie, MN (US)" with the following: --Eden Prairie, MN (US)--

Title Page; item (56);
On page 2 of the issued patent, under U.S. PATENT DOCUMENTS, replace the listing of "6,544,428 B1    4/2003    Higashi"
with the following:
   --6,654,428 B1    11/2003    Bose et al.--

Title Page; item (56);
On page 2 of the issued patent, under OTHER PUBLICATIONS, replace the listing of "U.S. Appl. No. 11/095,949, Hedin et al."
with the following:
   --U.S. Appl. No. 11/094,949, Hedin et al.--

Signed and Sealed this

Eighth Day of December, 2009

David J. Kappos
*Director of the United States Patent and Trademark Office*